3,203,994
PURIFICATION OF META-PHENYLENE-
DIAMINE
Louis Spiegler, Woodbury, N.J., assignor to E. I. du Pont de Nemours and Company, Wilmington, Del., a corporation of Delaware
No Drawing. Filed Dec. 27, 1962, Ser. No. 247,511
6 Claims. (Cl. 260—582)

This invention is directed to a process for the purification and stabilization of m-phenylenediamine and more particularly to the purification and stabilization of m-phenylenediamine by extraction with non-polar, water immiscible solvents.

Meta-phenylenediamine is a widely used intermediate for dyes and other chemicals. When freshly prepared, it is a white or almost white substance which discolors rapidly upon standing. Although the stabilization of m-phenylenediamine has been the subject of much investigation through the years, no completely satisfactory method for the stabilization of m-phenylenediamine has as yet been found. The technical product, m-phenylenediamine, when heated above its melting point decomposes to a certain extent, as evidenced by the evolution of ammonia, the discoloration of the product, and the formation of a tar. This decomposition results in a loss of 5–10% of the product.

Among the various methods suggested for the prevention of discoloration and deterioration have been the separation of the m-phenylenediamine product from the ortho and para isomers by salt formation, by the addition of stabilizers and by the passage of molten m-phenylenediamine through solid adsorbents. However, even with these previously suggested purification treatments, the color and thermal stability of the resulting m-phenylenediamine product are not sufficiently improved to enable the product to find wide application in the recently developed use for m-phenylenediamine as a curing agent for epoxy resins. These epoxy resins are in themselves water-white or amber in color and are cured at temperatures above the melting point of meta-phenylenediamine. Thus it is imperative that the curing agent incorporated therein also be light in color and not discolor during curing, especially if a light, resinous product is desired.

It is, therefore, an object of this invention to provide a novel process for the production of a white, thermally stable m-phenylenediamine. It is another object of this invention to provide a novel meta-phenylenediamine product which can be distilled without decomposition or discoloration and without loss of the m-phenylenediamine product.

It has been observed that the presence of volatile colored organic impurities, such as nitro, hydrazo, azo and azoxy compounds, influence the decomposition of m-phenylenediamine, as well as small amounts of isomeric o- and p-phenylenediamine, which invariably are present even under optimum conditions of commercial manufacture. However, these organic impurities alone are not completely responsible for the deterioration decomposition of m-phenylenediamine. It has been found that traces of moisture together with the aforementioned organic impurities cause rapid decomposition of technical m-phenylenediamine containing small amounts of isomers. This invention, therefore, provides a simple, easy and economical method for the thermal stabilization and purification of m-phenylenediamine by removal of both moisture and organic impurities.

More specifically, this invention is directed to a process for the preparation of thermally stable m-phenylenediamine, which process comprises extracting m-phenylenediamine at 60°–80° C. with a non-polar, water immiscible solvent, whose solvent power for m-phenylenediamine is less than 5% and having a boiling point between the melting and boiling points of m-phenylenediamine, separating the solvent layer from the m-phenylenediamine, and distilling the m-phenylenediamine layer to recover an improved thermally stable product.

The process of this invention applies to the stabilization of freshly prepared m-phenylenediamine. The particular method used for its preparation is not material to the practice of this novel process. It may be obtained by any means known in the art. Usually, commercial manufacture is based on the reduction of dinitrobenzene. Since m-phenylenediamine discolors rapidly, it is necessary to treat the freshly prepared product as soon as it is isolated from the reaction mixture. The m-phenylenediamine thus obtained contains small amounts of ortho and para isomers, organic impurities, and traces of water.

According to the novel process of this invention, freshly prepared m-phenylenediamine is mixed with a non-polar, water immiscible solvent at about room temperature. The solubility of m-phenylenediamine in the non-polar, water immiscible solvent should be no more than about 5%, thus minimizing the loss of m-phenylenediamine product in the solvent.

In addition to the above-mentioned qualifications of the solvent, the solubility parameter proves to be a useful technique in determining the suitability of an organic solvent for the process of this invention. The solubility parameter is defined as the square root of the cohesive energy density, which is the molar energy of vaporization divided by the molar volume, both easily measured properties. (See A. V. Tobolsky, "Properties and Structures of Polymers," John Wiley, N.Y., 1960, p. 65, and J. H. Hildebrand and R. L. Scott, "The Solubility of Nonelectrolytes," Reinhold, N.Y., 1950, 3rd ed., pp. 129, 424 ff.) The solubility parameters of various liquids are given by both Tobolsky and Hildebrand and Scott. The cohesive energy densities of many liquids are also reported by Walker in J. Appl. Chem. (London), 2, 470 (1952). Preferably, the solubility parameter of the non-polar, water immiscible solvent used in the novel process should be below 9.3 at 25° C.

Solvents useful in the practice of this invention are liquid aliphatic and aromatic hydrocarbons and methyl siloxanes having a viscosity of about 0.6–1.0 centistoke at 25° C. and boiling below 200° C., such as, hexamethyldisiloxane, viscosity 0.65 centistoke, B.P. 100° C., octamethyltrisiloxane, viscosity 1.04 centistokes, B.P. 153° C., and mixtures of methyl siloxanes.

Representative solvents, applicable for use in the novel process of this invention, together with their boiling points and solubility parameters are listed in the table below.

| Solvent | Boiling Point, °C. | Solubility Parameter at 25° C. |
|---|---|---|
| Benzene | 80.1 | 9.2 |
| n-Hexane | 68.7 | 7.3 |
| Cyclohexane | 80.7 | 8.2 |
| Carbon tetrachloride | 76.8 | 8.6 |
| Hexamethyldisiloxane | 100 | about 5.0 |
| Dow Corning 200 Fluid 0.65 centistokes | 99.5 | about 5.0 |
| Perfluoro-n-heptane | 82.5 | 5.7 |
| Perfluoro(methylcyclohexane) | 76.4 | 5.7 |
| Perfluoro(ethylcyclopentane) | 75.0 | 5.7 |
| Perfluoro(dimethylcyclohexane) (o-, m- and p mixtures) | 101.9–102.1 | 5.7 |
| Hexafluorobenzene | 81–82/743 mm.Hg. | 8.1 |

The non-polar, water immiscible solvent and m-phenylenediamine are mixed in an appropriate vessel from which air can be evacuated and replaced with an inert gas, such as nitrogen. The air is evacuated since air in combination with moisture rapidly discolors m-phenylenediamine.

The mixture is heated and agitated under nitrogen at 760 mm. Hg to about 60° to 80° C. for about 15 to 30 minutes. The layers are allowed to separate, preferably while cooling the mixture to room temperature. The upper solvent layer is decanted from the mixture and the remaining m-phenylenediamine lower layer is vacuum distilled to remove the last traces of solvent and moisture and to recover the resulting thermally stable m-phenylenediamine product. Alternatively the solvent layer may be decanted while hot, without cooling, after which the m-phenylenediamine is subjected to vacuum distillation as described above. The extraction with solvent prior to the vacuum distillation may be repeated several times to ensure complete removal of impurities. If the amount of impurities is known to be large, four or five extractions may be necessary. In order to remove small amounts of impurities, two extractions are usually sufficient.

Since the last traces of the non-polar, water immiscible solvent are removed during the final distillation of the product, efficient separation of the solvent from the m-phenylenediamine which boils at 284-287° C. necessitates the selection of a solvent having a boiling point below 200° C.

A representative example illustrating the process of the invention is as follows. All parts are by weight.

*Example*

41.3 parts of technical, freshly distilled m-phenylenediamine and 50 parts of dry benzene were charged into a vessel capable of being evacuated. The air in the system was displaced with nitrogen by evacuation to 100-150 mm. Hg pressure and repressurizing to 760 mm. Hg. The mixture was heated with agitation to 75°-80° C. and held at that temperature with continued agitation for 15 minutes. The system was cooled to room temperature without agitation and the upper benzene layer was separated by decantation from the solidified m-phenylenediamine layer. The extraction was repeated four times, after which the extracted m-phenylenediamine was vacuum distilled to obtain a water-white product which was color stable and did not evolve ammonia. A recovery of 85% of m-phenylenediamine was obtained.

By repeating the procedures of this example using n-hexane instead of dry benzene and 3 extractions, instead of 4 extractions, 85% of stable m-phenylenediamine was recovered.

The same procedure with cyclohexane as the non-polar, water immiscible solvent and 3 extractions gave 95% yield of stable m-phenylenediamine product.

A 93% yield of m-pheneylenediamine was obtained using Dow Corning 200 Fluid 0.65 centistoke as the non-polar, water immiscible solvent and 3 extractions.

In each case a white m-phenylenediamine product is obtained which is thermally stable. Contrasted with the technical product which deteriorates when heated above its melting point, the product purified by the herein described novel process can even be distilled (with a pot temperature of 210° C.) without discoloration, evolution of ammonia or formation of a tarry residue, and without resulting loss of the m-phenylenediamine product.

An added advantage of the process of the invention is that the treated m-phenylenediamine can be shipped in the molten state in tank cars, which is not practical with the technical grade due to deterioration and loss of product.

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A purification process for m-phenylenediamine, which process comprises contacting m-phenylenediamine at about 60-80° C. with a non-polar, water immiscible solvent, said solvent having a solvent power for m-phenylenediamine of less than 5% and having a boiling point between the melting point of m-phenylenediamine and 200° C., separating the solvent layer from the m-phenylenediamine layer, and distilling the m-phenylenediamine layer to recover an improved, stable m-phenylenediamine.

2. A purification process for m-phenylenediamine, which process comprises contacting m-phenylenediamine at about 6-80° C. with dry benzene, separating the benhexane layer from the m-phenylenediamine layer, and distilling the m-phenylenediamine layer to recover the improved, stable m-phenylenediamine.

3. A purification process for m-phenylenediamine, at about 60-80° C. with cyclohexane, separating the cyclohexane layer from the m-phenylenediamine layer, and distilling the m-phenylenediamine layer to recover the improved, stable m-phenylenediamine.

4. A purification process for m-phenylenediamine, which process comprises contacting m-phenylenediamine at about 60-80° C. with a methyl siloxane having a viscosity of about 0.6-1.0 centistoke at 25° C. and a boiling point between the melting point of m-phenylenediamine and 200° C., separating the methyl siloxane layer from the m-phenylenediamine layer, and distilling the m-phenylenediamine layer to recover an improved, stable m-phenylenediamine.

5. A purification process for m-phenylenediamine, which process comprises contacting m-phenylenediamine at about 60-80° C. with hexamethyldisiloxane, separating the hexamethyldisiloxane layer from the m-phenylenediamine layer, and distilling the m-phenylenediamine layer to recover an improved, stable m-phenylenediamine.

6. A purification process for m-phenylenediamine, which process consists essentially of the steps of contacting m-phenylenediamine at about 60-80° C. with a non-polar, water immiscible solvent, said solvent having a solvent power for m-phenylenediamine of less than 5%, a solubility parameter below 9.3 at 25° C., and a boiling point between the melting point of m-phenylenediamine and 200° C., separating the solvent layer from the m-phenylenediamine layer, and distilling the m-phenylenediamine to recover an improved, stable m-phenylenediamine.

References Cited by the Examiner

UNITED STATES PATENTS 2,389,802  11/45  McGregor et al. _____ 260-607

FOREIGN PATENTS 506,334  10/54  Canada.
328,210  4/30  Great Britain.

CHARLES B. PARKER, *Primary Examiner.*